United States Patent
Doud et al.

(10) Patent No.: US 7,377,598 B2
(45) Date of Patent: May 27, 2008

(54) AXLE HOUSING ASSEMBLY AND METHOD

(75) Inventors: Stephen C. Doud, Lake Orion, MI (US); Blair J. Swanson, Huntington Woods, MI (US); Jeffrey E. Rea, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 273 days.

(21) Appl. No.: 11/032,348

(22) Filed: Jan. 10, 2005

(65) Prior Publication Data

US 2006/0152070 A1 Jul. 13, 2006

(51) Int. Cl.
*B60B 35/16* (2006.01)
*B60K 17/16* (2006.01)

(52) U.S. Cl. ...................... 301/137; 180/378
(58) Field of Classification Search ............. 301/124.1, 301/125, 137; 280/124.11, 124.156, 93.51, 280/93.515; 180/378–380
See application file for complete search history.

(56) References Cited

U.S. PATENT DOCUMENTS

| 1,209,134 | A |   | 12/1916 | Dodge |
| 1,236,145 | A | * | 8/1917 | Burns ....................... 285/286.1 |
| 1,403,500 | A |   | 1/1922 | Huff |
| 1,823,158 | A |   | 9/1931 | Mogford et al. |
| 2,569,452 | A |   | 10/1951 | Buckendale |
| 2,662,277 | A | * | 12/1953 | Stone ........................ 228/226 |
| 3,726,154 | A |   | 4/1973 | Diessner |
| 4,048,466 | A |   | 9/1977 | Toth et al. |
| 4,255,641 | A | * | 3/1981 | Connell et al. ................ 219/61 |
| 5,411,287 | A |   | 5/1995 | Henschen |
| 5,464,243 | A |   | 11/1995 | Maiwald et al. |
| 6,024,418 | A |   | 2/2000 | Ebert |
| 6,086,162 | A | * | 7/2000 | Pinch et al. ............. 301/124.1 |
| 6,189,413 | B1 |   | 2/2001 | Morse et al. |
| 2005/0184579 | A1 | * | 8/2005 | Bryant et al. .......... 301/63.105 |

* cited by examiner

*Primary Examiner*—Jason R Bellinger
(74) *Attorney, Agent, or Firm*—Harness, Dickey & Pierce, P.L.C.

(57) ABSTRACT

An axle housing assembly includes a cast iron tube having a pocket that is formed proximate a first end of the cast iron tube. The pocket is disposed generally transverse to a longitudinal axis of the cast iron tube. The axle housing assembly also includes an insert made of steel connected to the pocket. The steel insert permits the cast iron tube to be coupled to a cast iron carrier housing by welding steel plugs positioned in the carrier housing to the steel inserts.

34 Claims, 5 Drawing Sheets

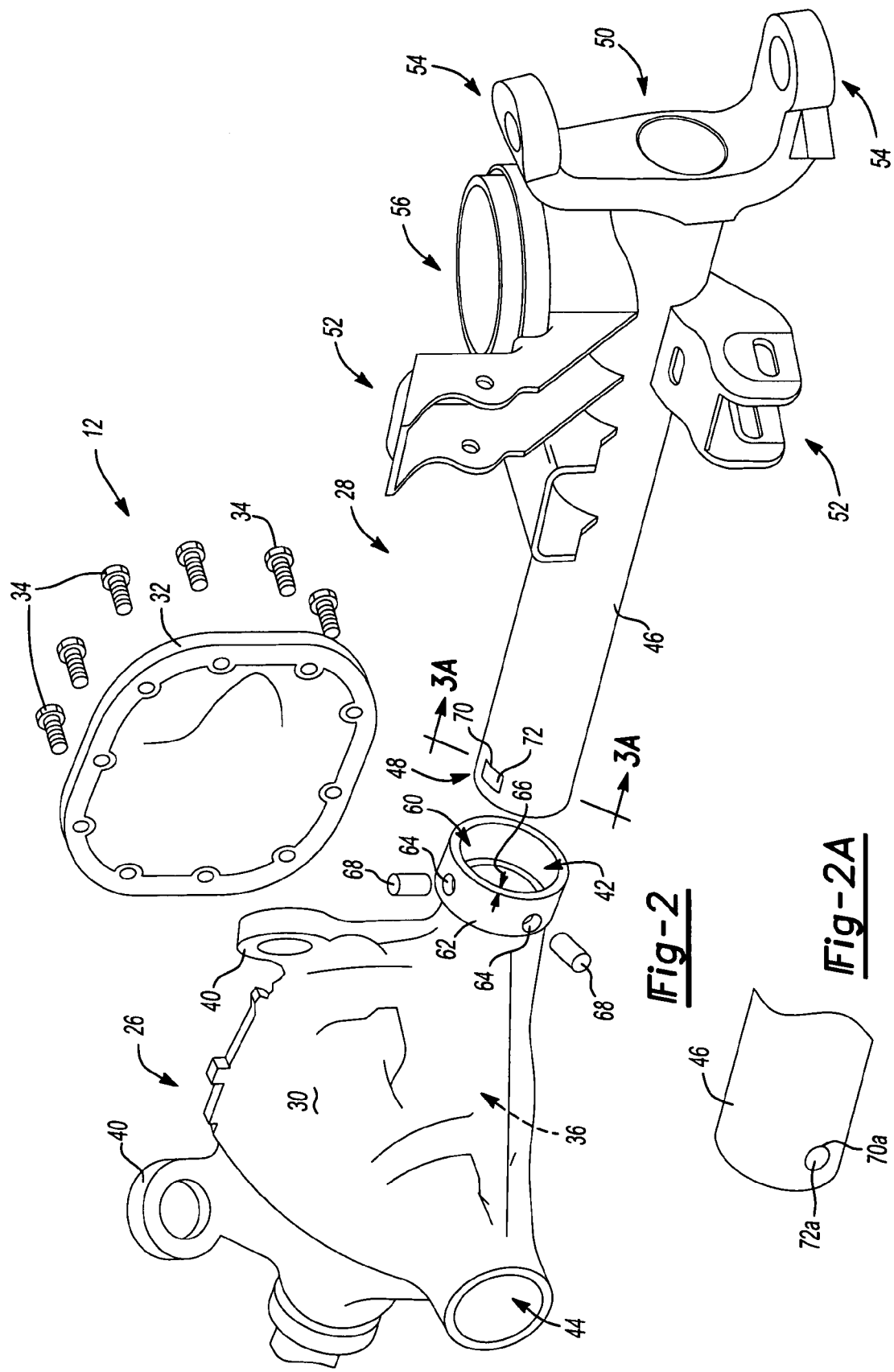

US 7,377,598 B2

AXLE HOUSING ASSEMBLY AND METHOD

FIELD OF THE INVENTION

The present invention relates to an axle housing assembly and more particularly relates to a device and a method for coupling a cast iron tube assembly to a cast iron carrier assembly.

BACKGROUND OF THE INVENTION

An axle housing assembly can include the carrier assembly and two tube assemblies that can be press-fit into the carrier assembly. The carrier assembly can hold a differential gear set and each of the tube assemblies can hold an axle shaft that can connect the differential gear set to each of a pair of wheels. Traditionally, the carrier assembly is made of cast iron and the tube assemblies are made of steel. Multiple components made from steel can be formed from or welded to each of the steel tube assemblies, for example steering knuckles, suspension brackets and/or hydraulic connectors.

In addition to coupling each of the tube assemblies to the carrier assembly with the press-fit, each of the tube assemblies can be slug-welded to the carrier assembly. Slug-welding, for example, can include forming a plurality of holes at two locations where each of the tube assemblies couples to the carrier assembly. Steel plugs can be inserted into the plurality of holes and contact each of the steel tube assemblies. The steel plugs can then be welded to each of the tube assemblies to further secure each of the tube assemblies to the cast iron carrier assembly.

In another example, each of the tube assemblies can be made from cast iron. Forming the tube assemblies from cast iron can reduce complexity and therefore save cost, but renders the connection of steel plugs to the tube assemblies somewhat more complex.

SUMMARY OF THE INVENTION

The present invention includes an axle housing assembly including a cast iron tube having a pocket. The pocket is formed proximate a first end of the cast iron tube. The pocket is also disposed generally transverse to a longitudinal axis of the cast iron tube. The axle housing assembly also includes an insert made of steel connected to the pocket.

Further areas of applicability of the present invention will become apparent from the detailed description provided hereinafter. It will be understood that the detailed description and specific examples, while indicating the various embodiments of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

FIG. 2 is a perspective view of a carrier assembly and a tube assembly constructed in accordance with the various embodiments of the present invention;

DETAILED DESCRIPTION OF THE VARIOUS EMBODIMENTS

The following description of the various embodiments is merely exemplary in nature and is in no way intended to limit the invention, its application or uses.

Figure 1:
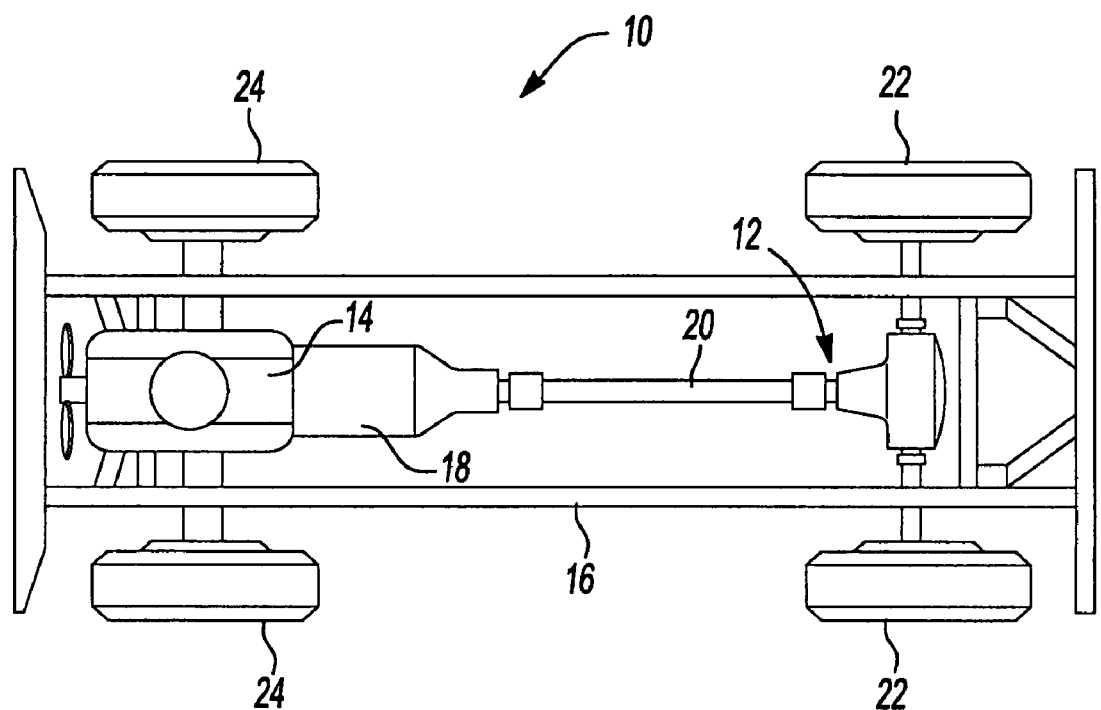
FIG. 1 is a top view of an exemplary vehicle showing an axle assembly housing constructed in accordance with the various embodiments of the present invention.

With reference to FIG. 1, an exemplary vehicle 10 is shown with an axle assembly 12 constructed in accordance with the teachings of the present invention. The exemplary vehicle 10 can include an engine 14, a frame 16, a transmission 18, a driveshaft 20, a pair of driven wheels 22 and a pair of optionally-driven wheels 24. The engine 14 produces an output having a torque component in a manner known in the art and transmits the output to the transmission 18. The transmission 18 can reduce the speed and increase the torque of the output produced by the engine 14 and transmit a torque to the axle assembly 12 through the driveshaft 20. The axle assembly 12 can transmit the torque to the pair of driven wheels 22 to propel the vehicle 10. It will be appreciated that the optionally-driven wheels 24 can connect to the transmission 18 in a manner known in the art (e.g., a four-wheel drive configuration).

Figure 6:
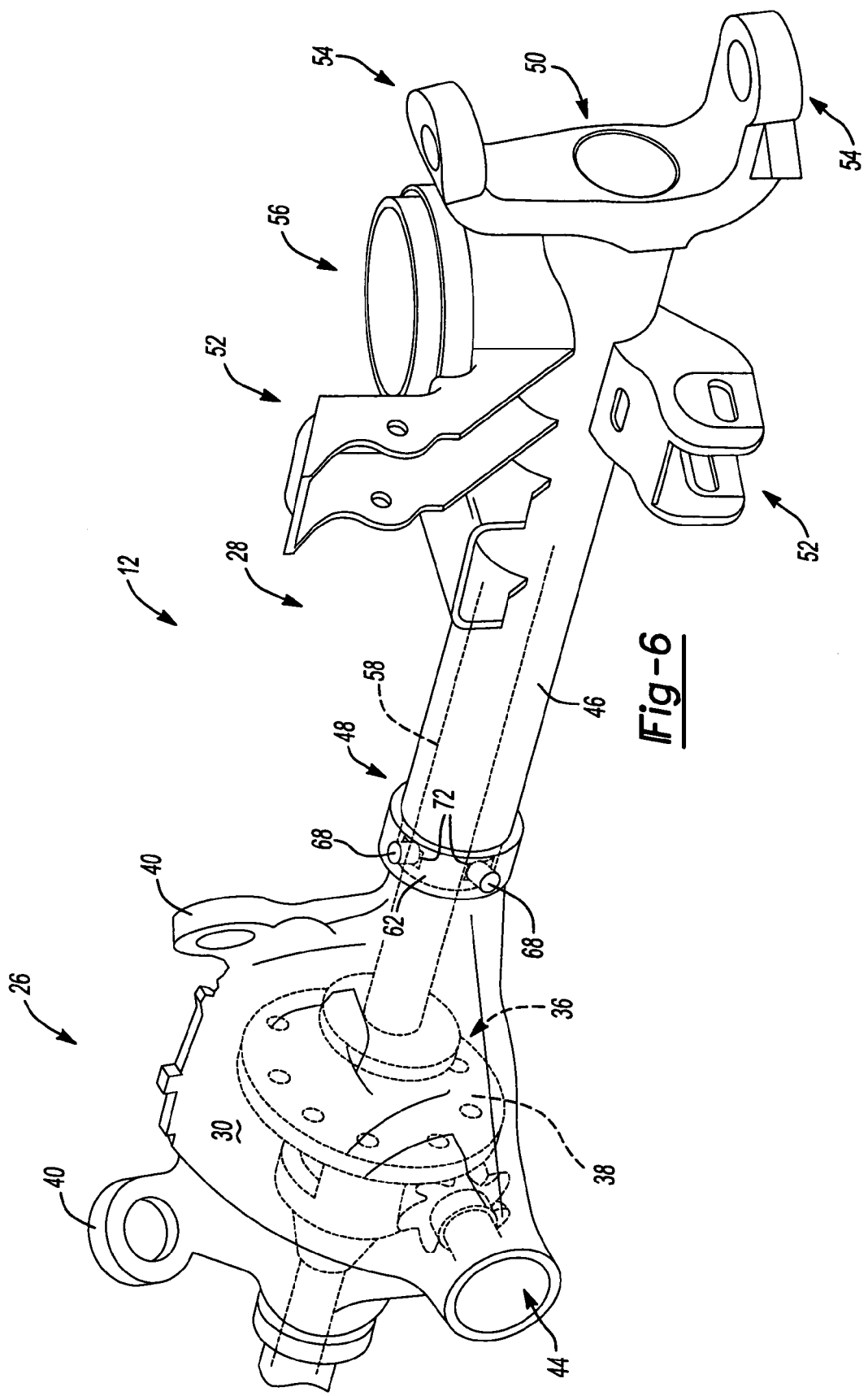
FIG. 6 is similar to FIG. 2 and shows the tube assembly coupled to the carrier assembly.

With reference to FIGS. 2 and 6, the axle assembly 12 can include a carrier assembly 26 and two tube assemblies 28. The carrier assembly 26 can include a carrier housing 30 and a carrier housing cover 32 that is removably connected to the carrier housing 30 with a plurality of fasteners 34. The carrier housing 30 can define a carrier cavity 36 in which a differential gear set 38 can reside. The carrier housing 30 can be configured to include one or more suspension brackets 40, a pair of tube assembly apertures 42 and/or a pinion aperture 44. The suspension brackets 40 can connect to an exemplary suspension system in a manner that is well known in the art. The carrier housing 30 can be made of cast iron.

Each of the tube assemblies 28 can include a tube member 46 having a first end 48 that can be configured to connect with the carrier assembly 26 and a second end 50 that can connect with either one of the driven wheels 22 (FIG. 1). The tube assemblies 28 can include suspension brackets 52, steering knuckles 54, and/or a coil spring holder 56 if appropriate. An axle shaft 58 can be disposed in each tube member 46 and can be coupled for rotation with the differential gear set 38 and to one of the driven wheels 22 (FIG. 1) in a manner known in the art. Each of the axle shafts 58 can be journally supported for rotation by one or more axle shaft bearings (not shown) that can be housed in the tube member 46. The differential gear set 38 can be configured to transfer power received from the driveshaft 20 to the axle shafts 58.

Each of the tube assemblies 28 and the carrier housing 30 can be substantially made from cast iron and can be made from respective castings. It will be appreciated that the suspension brackets 40, 52, the coil spring holder 56, the pair of tube assembly apertures 42, the pinion aperture 44 and/or the steering knuckles 54 can be formed during the casting process. One exemplary type of casting process is commonly referred to as Lost Foam casting. The Lost Foam casting process and other exemplary suitable casting processes are disclosed in greater detail in commonly assigned U.S. Pat. No. 6,189,413 B1, entitled Captive Molding With Dissimilar Material Inserts, issued Feb. 20, 2001, which is hereby incorporated by reference as if fully set forth herein.

Each of the tube assembly apertures 42 on the carrier housing 30 can include a collar 60 that can be configured so that the tube assembly 28 can be press-fit therein. The collar 60 can include an outer annular surface 62 in which a plurality of holes 64 can be formed therethrough. The collar 60 can have a dimension that defines a thickness 66. A plurality of pins or plugs 68, which can be formed of steel, can be inserted into the respective holes 64 formed in the collar 60 and into contact with the tube assembly 28. It will be appreciated that the plurality of holes 64 can be formed in the collar 60 by various suitable forming processes, for example, machining the holes 64 into the collar 60 or forming the holes 64 in the collar 60 during an exemplary casting process. It will also be appreciated that the plugs 68 can be cast in place when the cast iron carrier housing 30 is formed in accordance with the methodology described in the above-referenced U.S. Pat. No. 6,189,413 B1.

With reference to FIGS. 2 and 3A-3F, the first end 48 of the tube assembly 28 can include one or more pockets 70. An insert 72 that can be made of steel can be disposed in the pocket 70. The pocket 70 can be formed in the first end 48 with various suitable methods, such as machining the pocket 70 in the first end 48. It will be appreciated that the pocket 70 can be formed during the casting process with the insert 72 disposed in and secured to the pocket 70. In the Lost Foam casting process, for example, the insert 72 can be placed in a foam mold (not shown) used in the Lost Foam process such that when molten iron is poured into the foam mold the finished casting will include the insert 72 fixedly attached to the pocket 70.

Figure 3A:
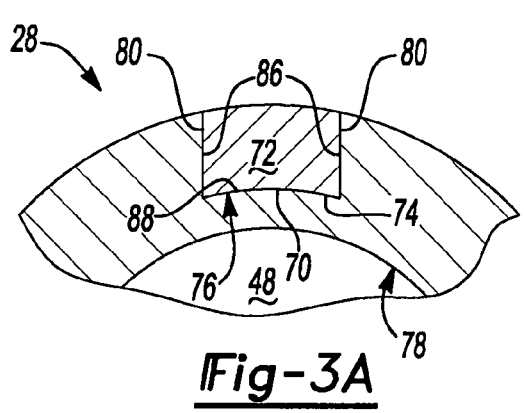
FIGS. 3A-3F are cross-sectional views showing various embodiments of a steel insert positioned in the tube assembly constructed in accordance with the various embodiments of the present invention.

With reference to FIG. 3A, one embodiment of the present invention includes a bottom 74 of the pocket 70 that can have a curvature 76, which approximates a curvature of the tube assembly 28. A pair of walls 80 of the pocket 70 can be about parallel to each other. The pair of walls 80 of the pocket 70 can be formed such that the walls 80 would completely or partially converge, as indicated by reference number 82 and shown in FIG. 3E, or diverge as indicated by reference number 84 and shown in phantom in FIG. 3A. It will be appreciated that a pair of sides 86 and a bottom 88 of the insert 72 can have a shape that is complimentary to the pocket 70. It will also be appreciated that the insert 72 and the pocket 70 need not be rectangular in shape but may be circular, oval or other suitable shapes. As such, a circular insert 72a received in a circular pocket 70a is shown in FIG. 2. Moreover, the various below described configurations of the pair of sides 86 of the insert 72 and the pair of walls 80 of the pocket 70 may be applicable to the circular insert 72a and the circular pocket 70a.

Figure 3B:
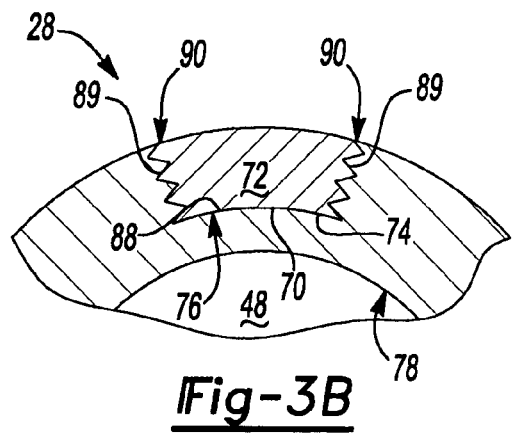
Figure 3C:
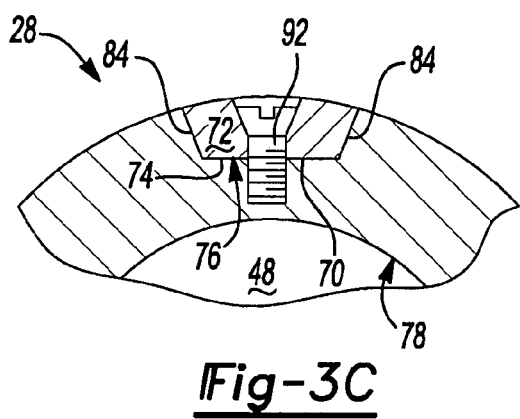
Figure 3D:
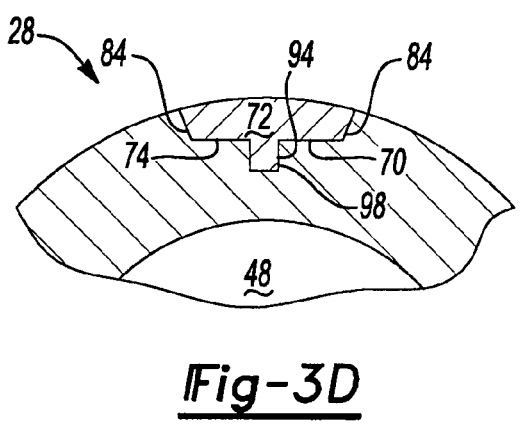
Figure 3E:
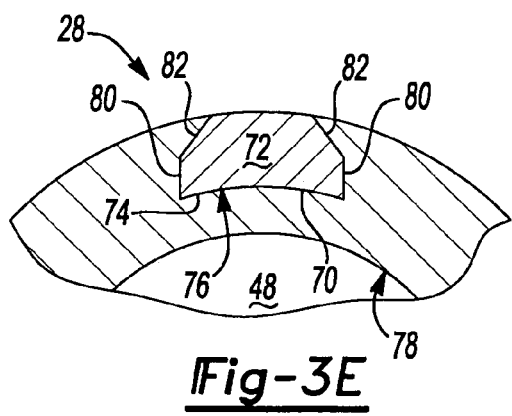

With reference to FIG. 3B, one embodiment of the present invention can include the insert 72 that can have serrated or dovetail walls 80. The pocket 70 can have walls with a complementary shape, generally indicated by reference number 90, to further secure the insert 72 into the pocket 70. With reference to FIG. 3C, one embodiment of the present invention can include a mechanical fastener 92 that can be used to secure the insert 72 into the pocket 70. By way of example, the fastener 92 can be threaded through the insert 72 and the pocket 70 formed into the tube assembly 28. With reference to FIG. 3D, one embodiment of the present invention can include the insert 72 that can include a post 94 extending from the insert 72 into the pocket 70 formed in the tube assembly 28. The post 94 can extend in a direction toward a center 96 (FIG. 4) of the tube assembly 28. By way of example, an aperture 98 can be formed in the pocket 70 and be configured to accept the post 94, for example, with a taper-lock or an interference fit.

Figure 3F:
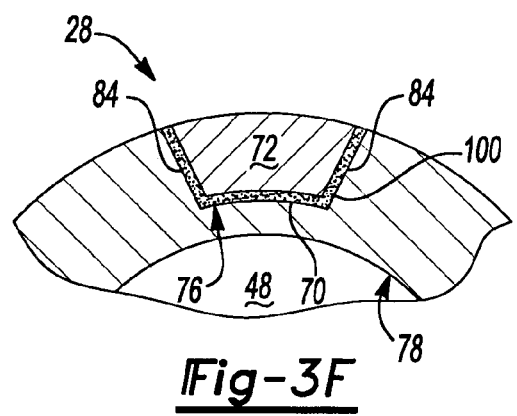

With reference to FIG. 3F, one embodiment of the present invention can include the insert 72 that can be placed in the pocket 70 and secured with a suitable adhesive 100. The adhesive 100 placed between the insert 72 and the pocket 70 can include various suitable acrylics or epoxies. Suitable adhesives for use in accordance with the present invention may include, for example, an acrylic adhesive comprising a urethane methacrylate. By way of example, one suitable acrylic adhesive is Loctite® 648, commercially available from Henkel Loctite Corp. of Auburn Hills, Mich.

Figure 4:
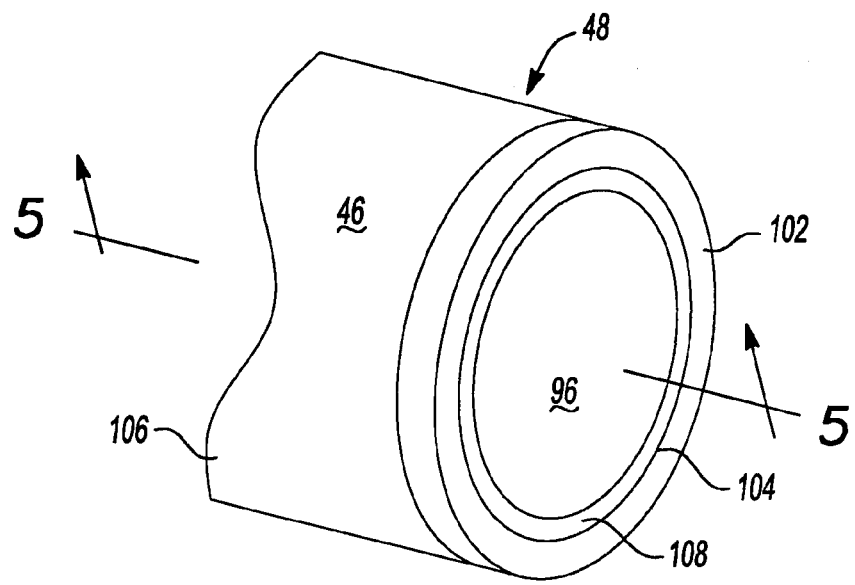
FIG. 4 is a perspective view of the tube assembly showing an annular member made of steel disposed in an annular depression formed on the tube assembly constructed in accordance with the various embodiments of the present invention.
Figure 5:
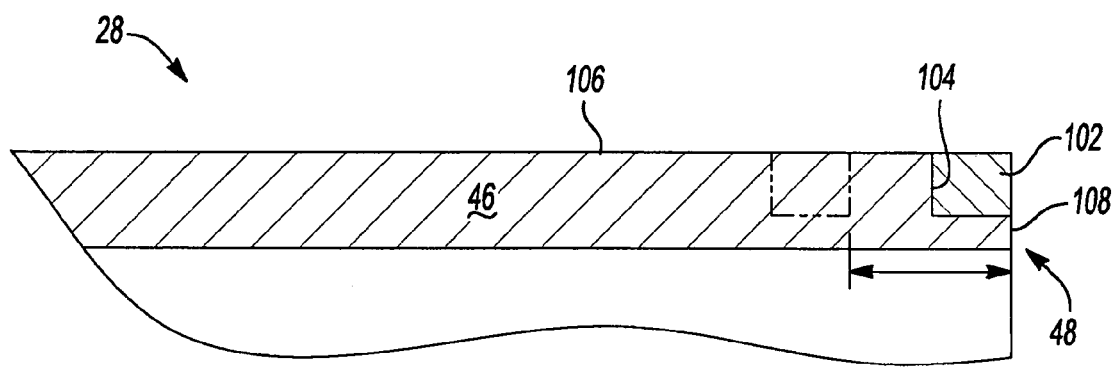
FIG. 5 is a cross-sectional view of FIG. 4 showing positions of the annular member with respect to a first end of the tube assembly.

With reference to FIGS. 4 and 5, one embodiment of the present invention can include an annular member 102 made of steel can be used in lieu of the above-mentioned inserts 72. By way of example, the annular member 102 can be placed in the foam mold (not shown) of the tube assembly 28 such that when the final casting is made, the annular member 102 can be positioned in an annular depression 104 adjacent to the first end 48. The annular member 102 in the annular depression 104 can be flush to an exterior surface 106 of the tube assembly 28. It will be appreciated that the annular member 102 can be located a predetermined distance from a terminus 108 of the first end 48 or flush with the terminus 108, as shown in FIG. 5. It will also be appreciated that the annular member 102 can be a complete ring or a partial ring and, to that end, the annular depression 104 can have a complementary shape (i.e., a partial or a full ring). It will further be appreciated that the distance at which the inserts 72, the pockets 70 and/or the annular member 102 is located from the terminus 108 of the first end 48 can be specific to each model of the axle assembly 12.

With reference to FIG. 6, the first end of the tube assembly 28 is inserted into the collar 60 on the carrier housing 30. The collar 60 can include a stop (not shown) to facilitate placement of the tube assembly 28 in the carrier housing 30 at a desired depth. The inserts 72 made of steel can be aligned to the plugs 68 and the plugs 68 can be welded to the inserts 72, for example, using a slug-welding process to thereby fixedly couple the tube assembly 28 to the carrier housing 30. The slug-welding process briefly includes, for example, heating the plugs 68 to a sufficient temperature whereby both the inserts 72 and the plugs 68 partially liquefy and then cool to form a single unit. By connecting the plugs 68, which are connected to the carrier housing 30, to the inserts 72, which are connected to the tube assembly 28, a steel-to-steel weld is formed. It will be appreciated that when the tube assembly 28 is slug-welded to the carrier assembly 26 both the slug-weld and the press-fit provide a robust connection to form the axle assembly 12.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An axle housing assembly comprising:
a cast iron tube having a pocket that is formed proximate a first end of said cast iron tube, wherein said pocket is disposed generally transverse to a longitudinal axis of said cast iron tube; and
an insert made of steel connected to said pocket such that a top surface of said insert is flush with an exterior surface of said tube.

2. The axle housing assembly of claim 1 wherein said pocket forms an aperture and said insert includes a post, said post disposed in said aperture.

3. The axle housing assembly of claim 1 wherein said pocket includes a pair of walls, said pair of walls each forming a serrated-structure, said insert includes a pair of sides, said pair of sides each forming a complementary serrated-structure to said serrated-structure on said pair of walls, said serrated-structure on said pair of walls connected to said complementary serrated-structure on said pair of sides.

4. The axle housing assembly of claim 1 wherein said pocket includes a pair of walls and a bottom portion having an angle between each of said pair of said walls and said bottom portion, and wherein said angle is one of an acute angle, an obtuse angle, and a right angle.

5. The axle housing assembly of claim 1 further comprising an adhesive between said pocket and said insert.

6. The axle housing assembly of claim 5 wherein said adhesive is an acrylic adhesive.

7. The axle housing assembly of claim 1 further comprising a fastener connecting said insert to said cast iron tube.

8. The axle housing assembly of claim 7 wherein said fastener includes a head and said insert includes a top surface that is about flush with an exterior surface of said tube assembly, and wherein said head of said fastener is disposed beneath said top surface of said insert.

9. The axle housing assembly of claim 1 further comprising a carrier housing at least partially made of cast iron, said carrier assembly having a collar defining an aperture configured to receive said first end of said cast iron tube therein.

10. The axle housing assembly of claim 9 wherein a hole is formed in said collar and a plug formed of steel is disposed in said hole.

11. The axle housing assembly of claim 10 wherein said plug is fixedly connected to said insert.

12. The axle housing assembly of claim 11 wherein said plug is welded to said insert.

13. The axle housing assembly of claim 1 wherein said pocket forms an at least partial annular depression that at least partially encircles said first end of the cast iron tube.

14. The axle housing assembly of claim 13 wherein said insert forms an at least partial annular member disposed in said at least partial annular depression.

15. The axle housing assembly of claim 13 wherein said insert is a complete ring made of steel and said pocket is a complete annular depression, said ring connected to said annular depression.

16. A combination comprising:
a first member made of cast iron, said first member having an exterior surface and a first end;
a pocket formed in said exterior surface of said first end;
a insert made of steel connected to said pocket;
a second member made of cast iron, said second member forming an aperture configured to receive said first end of said first member therein; and
a plug made of steel disposed in said second member proximate said aperture, said plug being fixedly connected to said insert.

17. The combination of claim 16 wherein said pocket forms an aperture and said insert includes a post, said post disposed in said aperture.

18. The combination of claim 16 wherein said pocket includes a pair of walls, said pair of walls each forming a serrated-structure, said insert includes a pair of sides, said pair of sides each forming a complementary serrated-structure to said serrated-structure on said pair of walls, said serrated-structure on said pair of walls connected to said complementary serrated-structure on said pair of sides.

19. The combination of claim 16 wherein said pocket includes a pair of walls and a bottom portion having an angle between each of said pair of said walls and said bottom portion, and wherein said angle is one of an acute angle, an obtuse angle, and a right angle.

20. The combination of claim 16 further comprising an adhesive between said pocket and said insert.

21. The combination of claim 20 wherein said adhesive is an acrylic adhesive.

22. The combination of claim 16 further comprising a fastener connecting said insert to said first member.

23. The combination of claim 16 further comprising a top surface of said insert, wherein said top surface of said insert is flush with said exterior surface of said first member proximate said first end.

24. The combination of claim 16 wherein said plug is welded to said insert.

25. The combination of claim 16 wherein said insert is a ring made of steel and said pocket is an annular depression, said ring connected to said annular depression.

26. An axle assembly comprising:
an axle tube made of cast iron, said axle tube having an exterior surface and a first end;
a pocket formed in said exterior surface of said first end;
an insert made of steel positioned within said pocket and coupled to said axle tube;
a carrier housing made of cast iron, said carrier housing having an aperture configured to receive said first end of said axle tube therein; and
a plug made of steel extending through said carrier housing and being fixedly connected to said insert.

27. The axle assembly of claim 26 wherein said pocket includes a recess extending inwardly from an outer cylindrical surface of said axle tube, said pocket extending a distance less than a thickness of said axle tube.

28. The axle assembly of claim 27 wherein said pocket includes a serrated wall and said insert includes a complementary serrated structure.

29. The axle assembly of claim 26 wherein said insert includes a top surface positioned flush with said exterior surface of said axle tube.

30. The axle assembly of claim 26 wherein said plug is welded to said insert.

31. The axle assembly of claim 26 further including a differential gear assembly positioned within said carrier housing.

32. The axle assembly of claim 31 wherein said axle tube is adapted to rotatably support an axle shaft driven by said differential assembly.

33. The axle assembly of claim 26 further including another insert positioned within another pocket formed in said axle tube, said inserts being circumferentially spaced apart from one another.

34. The axle assembly of claim 33 further including another steel plug extending through said carrier housing and being fixed to said another insert.

* * * * *